United States Patent [19]

Evans

[11] Patent Number: 4,979,794

[45] Date of Patent: Dec. 25, 1990

[54] FRICTION REDUCTION IN DRAWING OPTICAL CABLE INTO PROTECTIVE TUBES

[76] Inventor: Mike R. Evans, P.O. Box 1551, Middlebloro, Ky. 40965

[21] Appl. No.: 340,784

[22] Filed: Apr. 20, 1989

[51] Int. Cl.⁵ .............................................. G02B 6/44
[52] U.S. Cl. ................................................ 350/96.23
[58] Field of Search ..................................... 350/96.23

[56] References Cited

U.S. PATENT DOCUMENTS

| | | | |
|---|---|---|---|
| 3,750,058 | 7/1973 | Bankert et al. | 350/96.23 |
| 4,039,248 | 8/1977 | Franke et al. | 350/96.23 |
| 4,129,356 | 12/1978 | Oestreich | 350/96.23 |
| 4,232,935 | 11/1980 | Rohner et al. | 350/96.23 |
| 4,375,314 | 3/1983 | Sakuragi et al. | 350/96.23 |

Primary Examiner—William L. Sikes
Assistant Examiner—Robert E. Wise
Attorney, Agent, or Firm—Charles J. Brown

[57] ABSTRACT

An outer protective tube into which a fiber optic cable is drawn under tension having a multiplicity of protruberances on its inside surface presenting a corresponding multiplicity of discrete spaced non-linear sliding surfaces to said cable to reduce friction and the tension imposed on the cable.

2 Claims, 1 Drawing Sheet

FRICTION REDUCTION IN DRAWING OPTICAL CABLE INTO PROTECTIVE TUBES

BACKGROUND OF THE INVENTION

Fiber optic cables utilized increasingly in the communication field comprise indefinite flexible lengths of a fiber optic bundle and a load-bearing strand enclosed within a tubular sheath. When installed in the field the cable must be unwound from a reel and pulled under tension through a loose-fitting outer protective tube of similar length and flexibility. The outer tube is typically of plastic and when extruded it has a pull-line of ribbon or strand disposed inside it throughout its length. One end of the pull-line is attached to an end of the fiber optic cable and particularly its load-bearing strand so that the cable can be pulled through the outer tube.

Tensile loads of up to but not exceeding 600 to 1200 pounds may be imposed on fiber optic cables during the pulling operation. Because of friction of the cable on the inside surface of the outer tube the required loading becomes progressively greater as the operation proceeds. When the maximum allowable load is reached pulling must cease and that determines the overall length of the sheathed fiber optic cable.

To reduce that friction a silicone lubricatant is sometimes disposed over the inside surface of the outer protective tube when the tube is extruded. To the same end attempts have been made to reduce the contact area between the inside of the outer tube and the exterior of the fiber optic cable sheath by forming longitudinal inwardly projecting ridges on the inside surface of the outer tube against which the cable sheath slides. However a cable sheath of circular cross section sliding within a larger protective tube of circular cross section engages the tube along an extended linear contact area which is very close to a line contact, and it does not greatly reduce that area by forming ridges on the inside of the outer tube.

The principal object of the present invention is to substantially reduce the contact area between the exterior of the fiber optic cable and the inside of the protective outer tube and thereby reduce friction when the cable is pulled through the tube. This in turn permits longer lengths of cable to be drawn into protective tubing before reaching the maximum allowable tension load which the cable can withstand.

SUMMARY OF THE INVENTION

The invention provides a method of drawing a flexible fiber optic cable of indefinitely extended length into a flexible protective outer tube to loosely sheath the cable within the tube. The method comprises disposing a pull-line throughout the length of the outer tube and attaching one end of the pull-line to an end of the fiber optic cable. The cable is then pulled from one end under tension into the outer tube in sliding contact with a multiplicity of discrete spaced non-linear sliding surfaces presented to the cable by a corresponding multiplicity of protruberances on the interior surface of the outer tube.

It is preferred that the protruberances are of rounded convex shape.

DESCRIPTION OF PREFERRED EMBODIMENT

Figure 1:
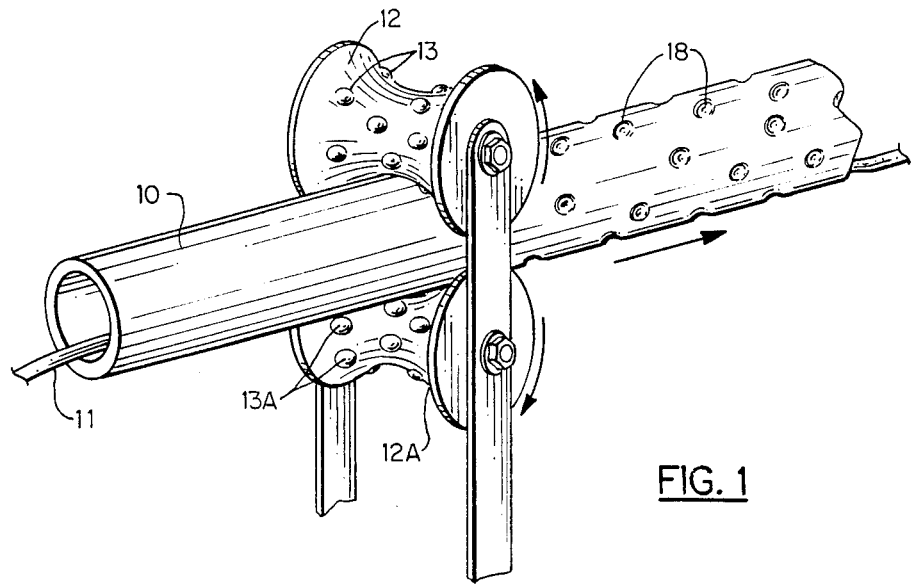
FIG. 1 is a pictorial view of rollers for continuously forming concave indentations on the outside of a tube for fiber optic cable.

Referring first to FIG. 1, a tube 10 emerges from an extruder with a line 11 threaded therethrough for later use as a pull-line. A silicone lubricant may be applied to the inside of the tube 10 as it is formed. The tube 10 is preferably of thermo plastic material such as polyethylene and may have an outer diameter of one inch or more. While still soft the tube 10 is directed through opposed rollers 12 and 12A which may be idlers rather than positively driven and which may be heated to deform the wall of the tube 10 as described below. The rollers 12 and 12A rotate in the direction of the arrows as shown.

Figure 2:
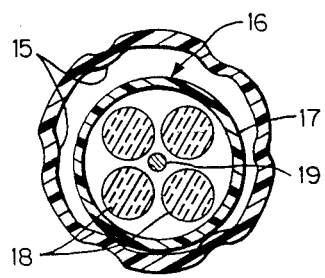
FIG. 2 is a lateral cross-section through the fiber optic cable within an outer protective tube according to the invention.

The rollers 12 and 12A are each formed with a semicircular circumferential groove which together forms a circular opening of substantially the same diameter as the outside diameter of the tube 10 entering the rollers. As a consequence the grooves in the rollers embrace but do not squeeze the nominal outside surface of the tube 10. However the surface of the grooves in the rollers 12 and 12A are formed with a multiplicity of protruberances 13 and 13A which are of convex rounded configuration. As the tube 10 passes between the rollers 12 and 12A in the direction of the arrow in FIG. 1 the protruberances 13 and 13A indent themselves into the tube wall to form concave indentations 14 in the outer surface thereof. This causes separate and discrete protruberances 15 of convex rounded configuration to be formed on the interior surface of the tube 10 as shown in FIG. 2. The protruberances 15 and the indentations 14 are arranged in a pattern repeating itself with close frequency throughout the length of the tube 10.

In accordance with the invention an indefinite length of the tube 10 within its pull-line 11 extending therethrough is rolled upon a reel and taken to the field site where it is to be used as a protective outer tube for a flexible fiber optic cable 16. As shown in FIG. 2 such a cable includes an outer tubular plastic sheath 17 and a plurality of optical fiber strands 18 therewithin. A load-bearing strand 19 extends through the cable for bearing tension during the pulling operation.

At the site one end of the pull-line 11 extending from the outer tube 10 is secured by suitable means to an end of the cable 16 so that tension can be transmitted from the pull-line 11 to the load-bearing strand 19. The cable 16 is thereby drawn into the tube 10 and as it does so it slides along the crowns of the protruberances 15 which present a multiplicity of discrete spaced non-linear sliding surfaces to the cable 16.

The minimal contact area between the crowns of the protruberances 15 and the exterior of the cable 16 results in a dramatic reduction in friction between the two as compared to the linear contact characteristic of outer tubes with a cylindrical or longitudinally ridged interior surface. Reduced friction makes possible an increase in the length of an optical cable 16 which can be drawn into the tube 10 without exceeding the yield point of the load-bearing strand 19.

I claim:

1. A method of drawing a flexible fiber optic cable of indefinitely extended length into a flexible protective outer tube to loosely sheath the cable within the tube which comprises
    (a) disposing a pull-line throughout the length of the outer tube,
    (b) attaching one end of the pull-line to an end of the fiber optic cable, and
    (c) pulling the cable from one end under tension into the outer tube in sliding contact with a multiplicity of discrete spaced non-linear sliding surfaces presented to the cable by a corresponding multiplicity of protruberances on the interior surface of the outer tube.

2. The method of claim 1 wherein the protruberances are of rounded convex shape.

* * * * *